United States Patent [19]

Malish

[11] Patent Number: 4,722,634
[45] Date of Patent: Feb. 2, 1988

[54] ADAPTER DEVICE FOR BROOMS OR THE LIKE

[76] Inventor: Terrance J. Malish, 2520 Red Fox Pass, Willoughby, Ohio 44094

[21] Appl. No.: 898,884

[22] Filed: Aug. 21, 1986

Related U.S. Application Data

[63] Continuation of Ser. No. 784,691, Oct. 3, 1985, abandoned, which is a continuation of Ser. No. 566,577, Dec. 29, 1983, abandoned.

[51] Int. Cl.$^4$ .............................................. F16B 9/00
[52] U.S. Cl. .................... 403/299; 403/361; 403/287
[58] Field of Search ............... 403/299, 192, 194, 198, 403/287, 301, 343, 334, 361, 263, 296, 406.1; 15/143 R, 145

[56] References Cited

U.S. PATENT DOCUMENTS

| | | | |
|---|---|---|---|
| 2,559,722 | 7/1951 | Lindstrom | 15/143 R |
| 2,975,004 | 3/1961 | Safianoff | 403/361 X |
| 3,152,820 | 10/1964 | Giampa et al. | 403/361 X |
| 3,462,147 | 8/1969 | Mancuso | 403/343 X |
| 3,524,210 | 8/1970 | McLean | 403/343 X |
| 3,582,117 | 6/1971 | Lundstrom | 403/343 |
| 3,667,787 | 6/1972 | Semour | 403/361 |
| 4,003,668 | 1/1977 | Kelly, III et al. | 403/287 |
| 4,127,342 | 11/1978 | Coggiola | 403/361 X |
| 4,371,282 | 2/1983 | Sturm | 403/299 X |
| 4,433,931 | 2/1984 | Malish et al. | 403/194 |

FOREIGN PATENT DOCUMENTS

| | | | |
|---|---|---|---|
| 233258 | 5/1925 | United Kingdom | 403/299 |
| 2058265 | 4/1981 | United Kingdom | 403/301 |

Primary Examiner—Randolph A. Reese
Assistant Examiner—Joseph A. Fischetti
Attorney, Agent, or Firm—Watts, Hoffmann, Fisher, Heinke Co.

[57] ABSTRACT

The present invention relates to an adapter device made from a polymeric material for detachably connecting a broom, brush, mop or the like to a hollow or solid core handle member. The device includes a unitary body constructed with a multi-diameter interior defining an internal shoulder portion adapted to abuttingly receive the end of a handle and a multi-step-down exterior terminating in a threaded or tapered male end portion adapted to be frictionally coupled into the corresponding female threaded or tapered socket in the brush head.

4 Claims, 5 Drawing Figures

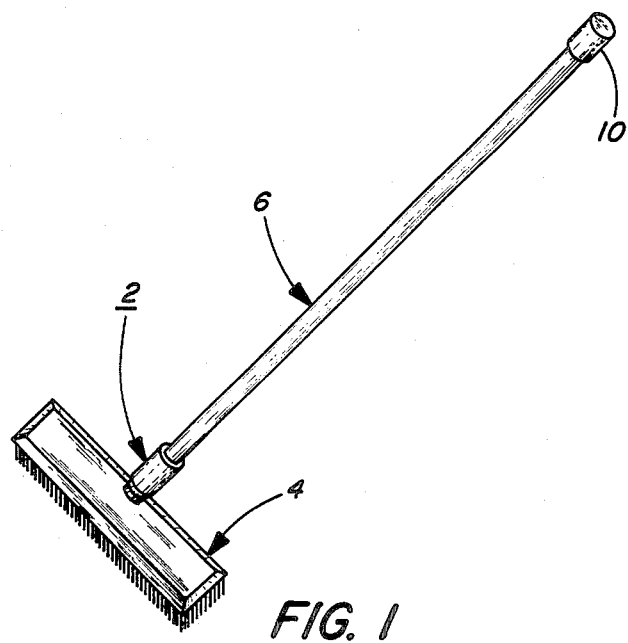
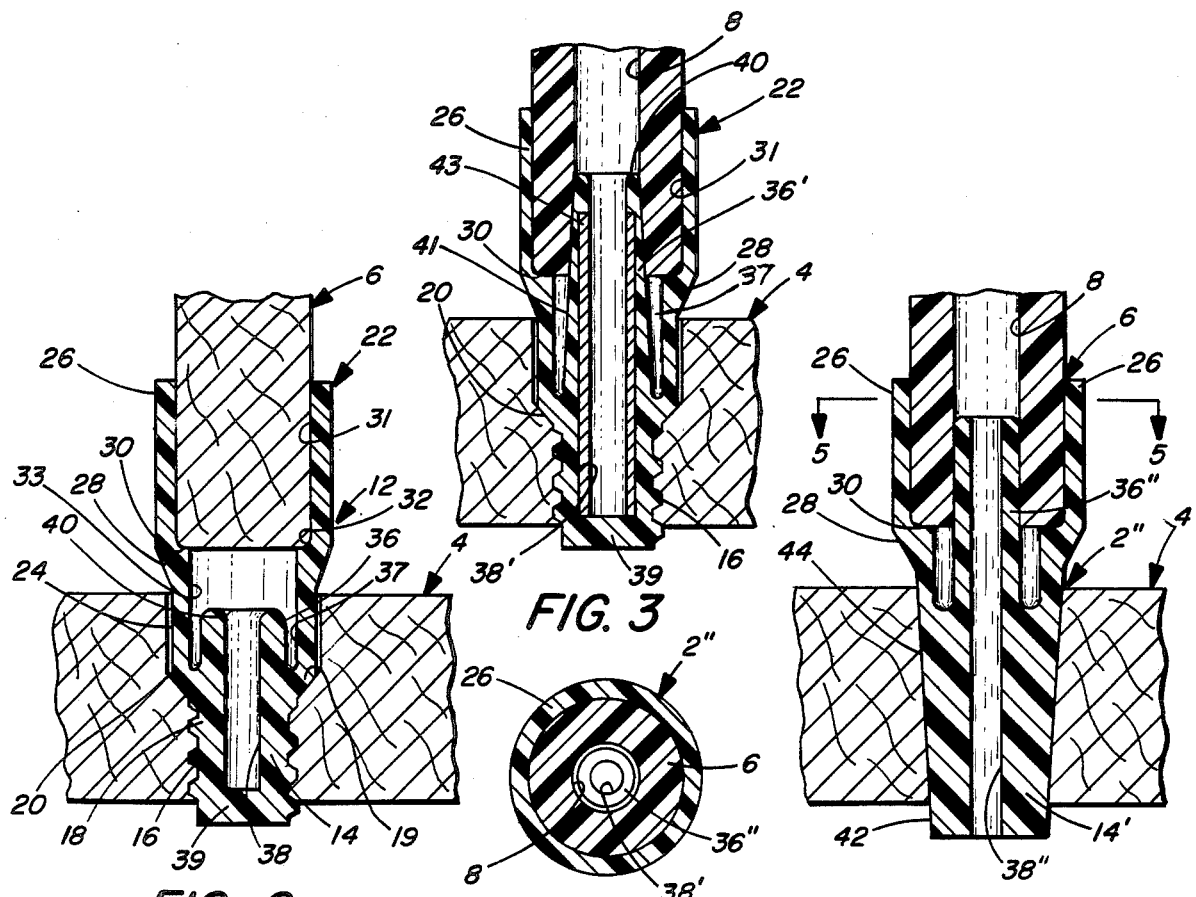

ADAPTER DEVICE FOR BROOMS OR THE LIKE

This application is a continuation of application Ser. No. 784,691, filed 10/3/85, now abandoned which is a continuation of application Ser. No. 566,577, filed 12/29/83, now abandoned.

TECHNICAL FIELD

The present invention relates to an adapter device made from a polymeric material for detachably connecting a broom, brush, mop or the like to a hollow or solid core handle member. The device includes a unitary body constructed with a multi-diameter interior defining an internal shoulder portion adapted to abuttingly receive the end of a handle and a multi-step-down exterior terminating in a threaded or tapered male end portion adapted to be frictionally coupled into the corresponding female threaded or tapered socket in the brush head.

RELATED APPLICATIONS

The subject of the present application relates to applicant' co-pending U.S. application Ser. No. 219,301 filed Dec. 31, 1980 now U.S. Pat. No. 4,433,931. The applicant adapts and incorporates by reference herein the disclosure of such co-pending application.

BACKGROUND ART

As noted in applicants forementioned U.S. application Ser. No. 219,301, the present invention is related especially to the construction of a unitary, polymeric adapter device for detachably coupling the handle (i.e. hollow or solid core) to a broom or brush head. Heretofore, various adapters or locking devices had been provided for detachably securing the working end portion (i.e. broom, brush, mop or the like) to a handle. A primary difficulty in such prior connections resides in the ability of the connection to "give" during twisting, torquing or pivotal movement of the handle relative to the head resulting in breaking or fracturing after repeated usage. More specifically, it has been found that the shear torque and/or pivotal forces are not adequately distributed and/or transmitted by such prior plastic adapter devices in order to withstand the relatively heavy load forces directed to the connection between the associated component parts such that the device tends to snap-off generally adjacent the juncture between the handle and the entry to the female socket in the brush head. Accordingly, such prior devices do not incorporate optimum flexibility and strength characteristics so as to absorb the shock resulting from a severe twisting, torquing of the brush head or pivotal movement of the handle relative to the head of which often occurs in heavy-duty applications, such as in commercial and/or industrial floor maintenance.

A typical example of a prior plastic adapter is disclosed in U.S. Pat. No. 4,003,668 granted Jan. 18, 1977.

DISCLOSURE OF THE INVENTION

The present invention relates to a new and improved construction for an adapter device made from a polymeric material for heavy-duty applications in respect to detachably connecting a hollow or solid core handle to a broom or brush head. The adapter device has a unitary, body that, in one form, includes a multi-stepped interior configuration and a multi-stepped exterior configuration with the interior configuration defining an axial bore having an internal shoulder portion adapted for coacting abutting engagement with the corresponding terminal end surface of the handle. In one form, the multi-stepped exterior configuration terminates in a threaded nose portion, and in another form it terminates in a tapered nose portion with said threaded and tapered nose portions being adapted for frictional locking engagement within a corresponding female threaded or tapered socket provided in the brush head. By this construction and arrangement, this multi-stepped exterior configuration of the body provides an inclined abutting seat for coacting engagement with a confronting inclined seat on the interior of the socket whereby a resilient axial extension force is exerted on the threaded nose portion during threaded tightening of the handle. Thereafter, the elastic memory forces of the polymeric material act, by compression, to axially lock the brush head to the handle. In one form, an elongated post member extends axially away from the nose portion of the adapter so as to be received in friction holding engagement within the bore defining the hollow handle. In another form, the post member is spaced laterally from the terminal end of the handle with the handle being supported in abutting engagement on the internal shoulder portion. In one form, the device includes an axial passageway extending through the nose and post portions to provide a flow-through construction to permit the introduction or removal of fluids (i.e. cleaning liquids or the like) to or from the brush head. In another form, the post portion includes a strengthening and reinforcement element extending axially therethrough.

Other advantages and objects of the invention will become apparent as the following description proceeds when taken in conjunction with the accompanying drawings.

BRIEF DESCRIPTION OF THE DRAWINGS

FIG. 1 is a generally perspective view illustrating the adapter device of the present invention for use in connection with a push-type broom;

FIG. 2 is a fragmentary, generally vertical section view illustrating the adapter device for detachably connecting the working end of the broom of FIG. 1;

FIG. 3 is a fragmentary, generally vertical section view illustrating a modified form of the adapter device of the present invention;

FIG. 4 is a fragmentary, generally vertical section view illustrating a further modification of the adapter device of the present invention; and FIG. 5 is a horizontal section view taken along the line 5—5 of FIG. 4.

BEST MODE FOR CARRYING OUT THE INVENTION

Referring now again to the drawings and in particular to FIG. 1 thereof, there is illustrated the adapter device, designated generally at 2, of the invention disposed for use in detachably connecting a working end element 4, such as a broom, brush, or the like, to an elongated handle, designated generally at 6. In the invention, it will be seen that the adapter device can be effectively employed in any type of broom, brush, mop or the like.

In the one form, the handle is of a hollow construction having an axial passageway, as at 8, extending therethrough. For this purpose, the passageway 8 may extend throughout the handle and maybe provided with a cap element, as at 10, to provide a smooth and finished terminal end construction. In one form, the handle is preferably made of a relatively light weight yet high strength material, such as fiberglass or the like, that has non-conductive, properties for safety purposes.

As best illustrated in FIG. 2, the adapter device in one form includes an elongated, generally cylindrical body member 12 including a unitary nose portion 14 having an exterior threaded surface, as at 16. The threaded surface 16 is disposed for threading coacting engagement within a female thread socket, designated at 18, provided in the working end element or brush head 4. The nose portion 14 terminates in an annular tapered surface 20 which defines a seat portion. This seat portion provides an abutment and stop upon engagement with the confronting tapered surface 19 formed within the socket 18. Accordingly, the adapter device 2 can be threaded into the female socket 18 until the seat portion bottoms out against the confronting interior tapered surface 19 of the socket. In the invention, the seat portion 20 may have angle of inclination of approximately 40°, for example.

In this form, the engagement between abutting surfaces 19 and 20 act to impart axial extension forces on the resilient polymeric material of the nose portion 14 including the threads 16 as the handle is tightened into the threaded socket 18. After tightening, the reaction forces from the abutting surfaces 19 and 20 and the elastic memory properties of the polymeric material act to axially compress the nose portion 14 such that the threads 16 therein are pulled into tight friction engagement with the corresponding threads of the socket 16. For example, to insure a positive locking engagement, the handle may be twisted an extra one-fourth-turn on the threads, as desired.

In the embodiment illustrated, the seat portion 20 tapers upwardly and outwardly and merges into a generally cylindrical sleeve portion, designated generally at 22. The sleeve portion has a lower reduced diameter section 24 and, upper enlarged diameter section 26 which are integrally joined together by another tapered portion, as at 28. This structure together defines the interior peripheral shoulder portion 30. The upper tapered portion 28 extends upwardly and outwardly preferably at an angle of inclination of approximately 25°, whereas, the shoulder portion 30 has a generally planar ledgelike configuration so as to provide an abutment and stop for the corresponding edge portion, as at 32, of the handle 6. Accordingly, the upper sleeve section 26 includes an axial bore 31 having a uniform transverse dimension so as to slideably receive therein the transverse dimension of the handle 6. Preferably, the upper sleeve section 26 has a diameter so as to tightly receive in a generally slip-fit relationship the transverse dimension of the handle so as to frictionally retain the same therein. The lower reduced diameter section 24 is defined by an axially bore 33 which is disposed in concentric relationship relative to the upper axially bore 31. Accordingly, the exterior of the adapter device is provided with a double-step configuration defined by the upper 28 and lower 20 tapered surfaces, whereas, the interior configuration includes the annular shoulder portion 30. This supports the handle adjacent the juncture of the sleeve portion 26 with the upper tapered portion 28 thereby to support the terminal end of the handle in axially spaced relation above the brush head 4.

Now in accordance with the invention, an upstanding post member 36 is made integral with and extends axially upward from the nose portion 14. In the embodiment illustrated, the post member 36 is disposed concentrically within the bore 33 so as to define an annular groove, as at 37. In this embodiment, the post member 36 extends approximately mid-way along the axial length of the bore 33 so as to be disposed below the shoulder portion 30. Preferably, the post member 36 is of a hollow construction defined by a bore 38 extending therethrough but being closed, as at 39, at its bottom end.

Referring to FIG. 3 of the drawings, there is illustrated an adapter device which is generally similar to that illustrated in FIG. 2 wherein like reference numbers refer to like parts throughout. In this embodiment, however, the post portion 36' is of a frustoconical construction and is concentrically disposed within the sleeve rection 22 for axial registration within the passageway 8 provided in the handle. Preferably, the post member 36' is of a hollow construction defined by a bore 38' extending therethrough. By this arrangement, the post member 36 provides not only an effective high strength, locking engagement with the handle 6, but it also enables the handle to have sufficient "give" of "yield" capability to enable the adapter device to withstand severe twisting, torque and pivotal forces without breaking or fracturing. It is preferred that post member 36 have an axial length so as to terminate inwardly of the open end of the sleeve section 26 but above the interior shoulder portion 30. In the embodiment shown, the post member 36 terminates generally at the midpoint relative to the axial length of the upper sleeve portion 26. The post portion 3640 has a terminal end which may be chamfered, as at 40, to facilitate insertion of the same into the passageway 8. In the invention, it is preferred that the post member 3640 have a frusto-conical transverse dimension so as to be press-fit into the passageway 8 for frictionally retaining the handle within the adapter device.

In the embodiment illustrated, the post member 36' defines an annular groove 37 which has an inverted frustoconical configuration that opens into the axial bore 31 in the upper sleeve portion 26. In this form, the post member 36 may be provided with an elongated hollow reinforcement element, as at 43, which may be made of a metallic or rigid plastic material, for example.

In FIGS. 4 and 5 there is illustrated another embodiment of the adapter device, designated generally at 2", wherein like reference numbers refer to like part throughout. In this embodiment, the nose portion 14' is of an elongated, tapered construction with a continuous, smooth tapered surface 42 that is press-fit into a correspondingly shaped female socket 44 formed in the brush head. In this form, the tapered portion 42 merges upwardly and outwardly into the tapered portion 28 so that there is provided a single-stepped exterior configuration. The interior peripheral shoulder portion 30 provides an abutment for the terminal end of the handle 6 so as to support the same in axially spaced relation above the brush head 4. In this embodiment, the post portion 36" has a generally cylindrical construction with a uniform transverse diameter that is slightly greater than that of the corresponding diameter of the passageway 8 so as to provide a press-fit therein. In this form, the passageway 38" extends throughout the length of the nose portion 14' and the post member 36" so as to provide a fluid transmitting passageway therethrough.

In the embodiments illustrated in FIGS. 3–4 the handle 6 is preferably made of a hollow core 8 construction so as to deform upon press-fit insertion of the post member therein. Accordingly, this coupling action, in effect, actually compresses the material of the handle within predetermined limits so as to maximize the strength characteristics of the coupling path defined by the adapter device between the brush head and the handle.

In the invention, the adapter device is preferably made of a high impact-resistant polymeric material. Preferably, such material comprises a high impact-resistant nylon which has good flexibility and strength so as to absorb the shock resulting from the high torque loads imparted to the brush head encountered during heavy work load applications. It has been found in the invention that a high-impact nylon commercially available under the trademark CAPRON provides highly beneficial results. For the physical properties of such nylon material reference may be had to the following table A:

TABLE "A"

| | |
|---|---|
| Melting Point (°F.) | 420 |
| Specific Gravity | 1.08 |
| Yield Tensile Strength (psi) | 7500 |
| Break Elongation (%) | 160 |
| Flexural Modulus (psi) | 250,000 |
| Notched Izod Impact (ft. lbs./in.) | 17.0 |
| Drop Weight Impact (ft. lbs) | 140 |
| Heat Distortion Temperature (°F. & 264 psi) | 125 |

By utilizing such high impact-resilient polymeric material there is provided in the present invention an adapter device that, by reason on the exterior stepped configuration together with the relatively elevated axial support for the handle, transfers the torque forces away from the weak point of the adapter up toward the strength of the handle.

I claim:

1. An adapter device of the type for detachably mounting the working end element, such as a broom, brush, mop or the like to an elongated handle, said adapter device comprising a unitary body member made from a nylon material having good impact-resistant characteristics and with sufficient elastic memory characteristics to increase the securement between said working end element and said handle, said unitary body member including a nose portion adapted for frictional securement within a correspondingly shaped threaded socket provided in said working end element and a hollow, cylindrical sleeve portion extending upwardly away from said nose portion and in concentric relation therewith, said sleeve portion having an upper section and a lower section with said upper section having an open end adapted to slidably receive therein one end of said handle, said sleeve portion having a first tapered exterior portion commencing substantially at the juncture of said upper sleeve section with said lower sleeve section and said first tapered portion extending downwardly in a direction toward said nose portion and defining an interior annular shoulder portion between said upper and lower sleeve sections, the upper section of said sleeve portion being of an enlarged diameter relative to the reduced diameter of said lower section and said first tapered portion having an inverted, frusto-conical configuration extending between said upper and lower sleeve sections, said lower sleeve section being joined to said nose portion by a second tapered portion so as to define with said first tapered portion a double-stepped, in vertical section, exterior configuration, said second tapered portion disposed for engagement on a confronting conical seat portion provided in the socket in the said working end element, said nose portion having an exterior threaded surface adapted for threaded engagement within the correspondingly threaded socket provided in said working end element, a post portion made integral with and extending upwardly interiorly from said nose portion into said lower sleeve section and toward said inwardly extending annular shoulder portion, said post portion terminating axially inwardly of said first tapered portion so as to be disposed in axially spaced relation away from the confronting terminal end of the handle when the handle has bottomed-out in engaged relation on said interior annular shoulder portion, said second exterior tapered portion being disposed to engageably coact with the confronting interior conical seat portion provided in said socket so that the elastic memory forces of said nylon material of the adapter device act to axially compress said nose and sleeve portions toward one another such that the second tapered surface is drawn axially downward into engagement with the conical seat portion provided in the socket of said working end element.

2. An adapter device in accordance with claim 1, wherein said post portion extends axially approximately mid-way relative to the axial length of said sleeve portion.

3. An adapter device in accordance with claim 1, wherein said nylon material comprises CAPRON.

4. An adapter device in accordance with claim 1, wherein said post portion is of a hollow construction defined by a bore extending therethrough and being closed at its bottom end remote from said sleeve portion.

* * * * *